Patented Apr. 13, 1943

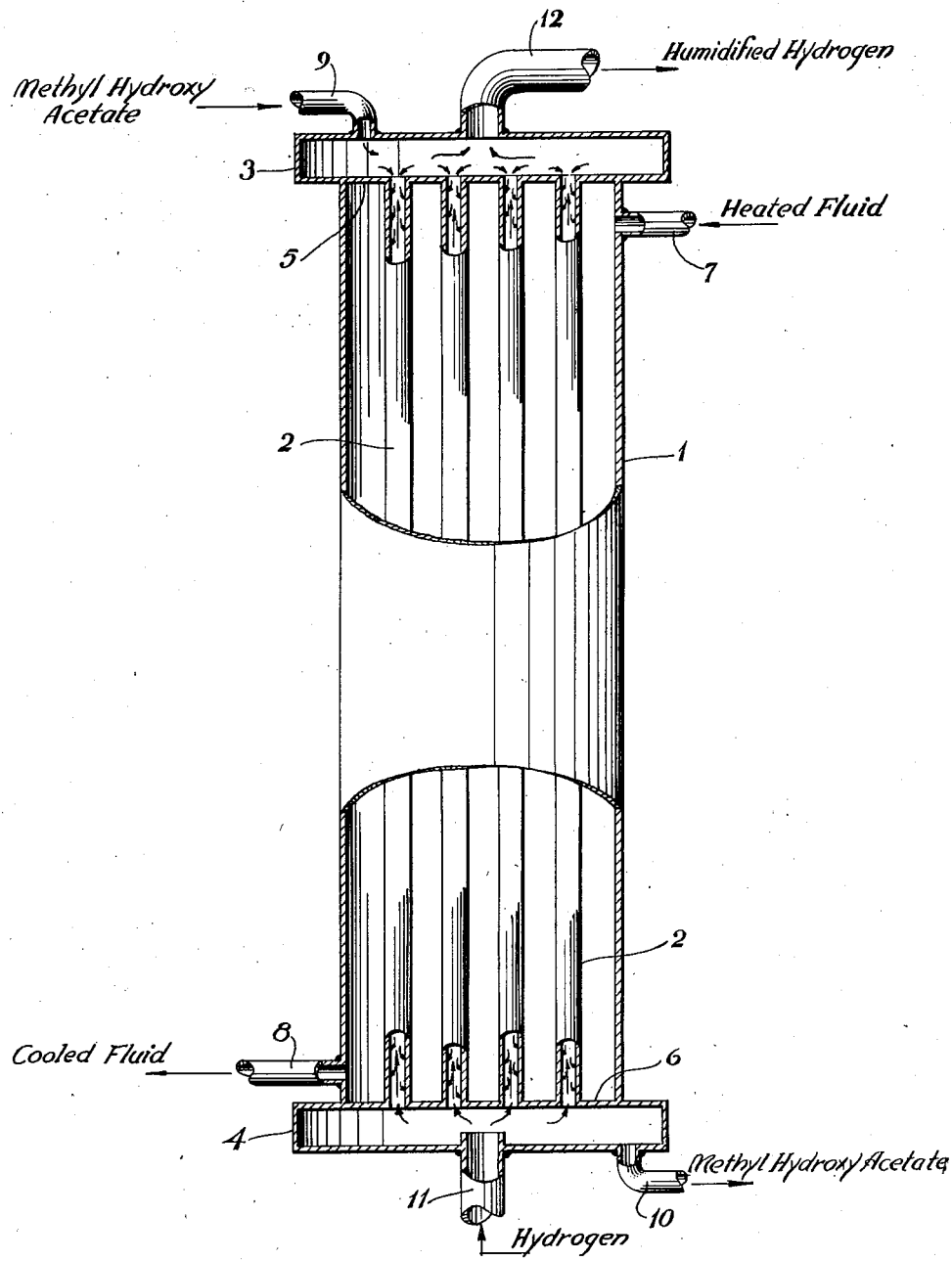

2,316,564

UNITED STATES PATENT OFFICE 2,316,564

HUMIDIFICATION

Robert Frank Cockerill, Elsmere, Del., assignor to E. I. du Pont de Nemours & Company, Wilmington, Del., a corporation of Delaware Application March 20, 1940, Serial No. 325,080

10 Claims. (Cl. 260—635)

This invention relates to a method of humidifying a gas with the vapors of a heat unstable organic compound and more particularly relates to the humidification of hydrogen with the esters of hydroxy acetic acid. The objects and advantages of the invention may be realized by examination of the accompanying figure which is a diagrammatic representation of a humidifier wherein the method of the present invention may be satisfactorily carried out.

The figure illustrates a cylindrical vessel 1, provided with a plurality of internal tubes 2 attached to upper and lower headers 3 and 4 respectively, through tube sheets 5 and 6 respectively. The internal tubes 2 are maintained at a desired temperature by means of a heated fluid flowing about the tubes and entering the cylindrical chamber 1 through pipe 7 and leaving said chamber 1 through pipe 8. The liquid to be vaporized enters the upper header 3 through pipe 9; and if there remains any unvaporized liquid, it flows from the humidifier through the exit pipe 10. The gas to be humidified enters the humidifier through the inlet pipe 11 and leaves the humidifier through the exit pipe 12.

For the purpose of illustration, the figure will be explained using methyl hydroxy acetate as the liquid to be vaporized and hydrogen as the gas to be humidified. Liquid methyl hydroxy acetate is introduced through pipe 9 into the header 3 and by means of a suitable distributing plate not shown the liquid is uniformly distributed over the surface of the header sheet 5 in such a manner that the liquid flows in a continuous film down the walls of each of the tubes 2. Hot water, and/or steam, is circulated in external contact with these tubes, and as the methyl hydroxy acetate falls in a continuous film downwardly through tubes 2, it contacts a countercurrent stream of hydrogen, which enters the humidifier through the inlet pipe 11 being distributed by the header 4 into the bottom of the tubes 2. As the hydrogen passes upwardly through tubes 2, it picks up the vapors of methyl hydroxy acetate and leaves the humidifier through the exit pipe 12 substantially saturated with the vapors of the ester. For humidification of this ester of hydroxy acetic acid and such esters as ethyl, n- and iso-propyl, and n- and isobutyl hydroxy acetates, it is preferable to maintain the tubes 2 at a temperature between 150° and 210° C., and the hydrogen entering the humidifier at a temperature between approximately 200° and 240°, if it be desired to obtain humidified hydrogen containing from 3 to 8 percent of the ester with substantially no decomposition of the esters.

This method of humidification is especially adapted for humidifying gases with an organic material which at elevated temperatures quickly decomposes, dehydrates, condenses, or otherwise is converted to undesirable products. It will be appreciated that the compound being vaporized is for no appreciable period of time at decomposition temperature and yet its vapor pressure is such that the vapors are readily picked up by the hydrogen or other gas being humidified. By operating in accord with this method, it is possible to humidify a gas efficiently and with substantially no decomposition of the liquid. If the tubes 2 are of relatively great length to cross section, satisfactory humidification of the gas can be obtained. Practically it has been found that humidification of the hydroxy acetic acid esters to the desired amount is realized if the tubes are heated to the above preferred temperatures and are of such length and the flow of liquid is so regulated that the time of flow of the liquid through the tube is less than 10 minutes and preferably between ½ and 5 minutes; contact times at these temperatures appreciably longer than 10 minutes results in considerable decomposition.

Furthermore, it has been found that the operating surface (i. e., the surface in contact with the liquid being vaporized) of the tubes should not be allowed to become dry, in other words, a small amount of the ester or other organic compound should preferably flow from tubes 2 into the header 4. When the method is so conducted, any decomposition products, such, for example, as glycolide, will be withdrawn from the humidification zone. If, one the other hand, the tubes are run dry at the lower ends, these decomposition products would likewise be vaporized into the gas being humidified.

This method is especially well adapted for the humidification of hydrogen with hydroxy acetic acid and its esters, such as methyl, ethyl, propyl, butyl, glycolyl, and higher esters of hydroxy acetic acid, the resulting gaseous mixture being subsequently subjected to the proper conditions for hydrogenation of the ester to ethylene glycol. An overall process is thereby provided which is most efficient in the utilization of the ester. The method is likewise applicable to the humidification of other easily decomposable liquids which must be heated in order to effect humidification.

I claim:

1. A process of humidifying hydrogen with a volatile alkyl hydroxy acetate which comprises flowing the alkyl hydroxy acetate in a liquid-falling film over a surface heated to a temperature between 150° and 210° C. while in contact with hydrogen heated to a temperature between 200° and 240° C. the liquid being in contact with the heated surface for not more than 10 minutes.

2. In a process for the hydrogenation of a volatile alkyl hydroxy acetate to ethylene glycol, the step which comprises humidifying the hydrogen by passing it in direct contact with a liquid-falling film of the alkyl ester of hydroxy acetic acid which is to be hydrogenated, the film of the ester being in contact with a surface for from ½ to 5 minutes, the surface being heated to a temperature between 150° to 210° C.

3. In a process for the hydrogenation of methyl hydroxy acetate to ethylene glycol, a step which comprises flowing a continuous liquid-falling film of methyl hydroxy acetate over a surface heated to a temperature between 150° and 210° C. while in direct contact with a countercurrent flow of hydrogen heated to a temperature between 200° and 240° C.

4. A process of humidifying hydrogen with hydroxyacetic acid which comprises flowing the hydroxyacetic acid in a continuous liquid-falling film over a heated surface while in direct contact with a stream of hydrogen.

5. A process of humidifying hydrogen with a volatile alkyl hydroxyacetate which comprises flowing the volatile alkyl hydroxyacetate in a continuous liquid-falling film over a heated surface while in direct contact with a stream of hydrogen.

6. A process of humidifying hydrogen with the vapors of hydroxyacetic acid which comprises flowing the hydroxyacetic acid, in a continuous liquid-falling film and in direct contact with a countercurrent flow of heated hydrogen, over a surface heated to a temperature not appreciably above 210° C., the acid being in contact with the surface for not more than 10 minutes.

7. A process of humidifying hydrogen with a volatile alkyl hydroxyacetate which comprises flowing the volatile alkyl hydroxyacetate, in a continuous liquid-falling film and in direct contact with a countercurrent flow of heated hydrogen, over a surface heated to a temperature not appreciably above 210° C., the ester being in contact with the surface for not more than 10 minutes.

8. A process of humidifying hydrogen with hydroxyacetic acid which comprises flowing the hydroxyacetic acid in a continuous liquid-falling film over a surface heated to a temperature between 150° and 210° C. while in contact with hydrogen heated to a temperature between 200° and 240° C.

9. A process of humidifying hydrogen with hydroxyacetic acid which comprises flowing the hydroxyacetic acid over a surface heated to a temperature below 210° C. in a continuous liquid-falling film while in direct contact with hydrogen, the flow being sufficient to give a liquid film over the whole operable heating surface.

10. A process of humidifying hydrogen with a volatile alkyl hydroxyacetate which comprises flowing the volatile alkyl hydroxyacetate over a surface heated to a temperature below 210° C. in a continuous liquid-falling film while in direct contact with hydrogen, the flow being sufficient to give a liquid film over the whole operable heating surface.

ROBERT FRANK COCKERILL.